United States Patent Office 2,734,044
Patented Feb. 7, 1956

2,734,044
OPTICAL CEMENT

Irving I. Bezman, Pittsburgh, Pa., and Francis J. Honn, Bloomfield, N. J., assignors to the United States of America as represented by the Secretary of the Army No Drawing. Application November 5, 1951, Serial No. 254,982

6 Claims. (Cl. 260—45.5)

This invention relates to a composition of matter useful as an optical cement, i. e. a cement for optical elements.

Heretofore, Canada balsam has been the most commonly used optical cement. It is a thermoplastic natural resin of the polystyrene variety, hardening on prolonged baking, but remaining permanently fusible. It is, however, not suitable in some applications because of its low softening point (less than 150° F.) and its tendency to shrink severely at low temperature (e. g. −65° F.) with the formation of large star-like voids. Furthermore, it tends to turn yellow over long periods of time.

In order to counteract the difficulties presented by Canada balsam, several synthetic resins and modified synthetic resins have been offered and employed as optical cements. These have been both of the thermoplastic and thermosetting types, but all of them usually suffer from one or more of the following disadvantages:

(1) Requires a solid catalyst which is difficult and slow in mixing;
(2) Precure necessary to obtain adequate viscosity;
(3) Refrigeration necessary for shipment and storage;
(4) Liquid form poisonous and irritating to the skin;
(5) Liquid life-time short after being catalyzed (only a few hours in some cases);
(6) Slippage of the cemented elements at high temperatures;
(7) Void formation at sub-zero temperatures;
(8) Separation of resin from glass under influence of weathering or high humidity, temperature extremes, or even storage under ordinary conditions;
(9) Discoloration (yellowing) in strong light;
(10) Excessive distortion of the shape of optical elements caused by the cement film;
(11) Unsatisfactory optical homogeneity (isotropy) as evidenced by polarized light and star image patterns.

It is accordingly an object of our invention to provide a new and improved optical cement, free from the disadvantages enumerated above. We have found that a styrene polymer can be used as the basis for such a cement. It is, therefore, another object of our invention to provide a new and improved optical cement with a styrene base. Other objects will appear hereinafter.

Polystyrene is a plastic material of outstanding optical clarity and homogeneity. This fact, together with the well-known water resistance of the material, suggested its possible application as an optical cement. Because it is a thermoplastic with a moderately high softening range, polystyrene was first applied to lenses as a "stick" cement. This technique of application consisted in applying the solid plastic to lenses heated above the softening point of the former. Up to 240° C., however, polystyrene did not become sufficiently fluid to permit removal of air bubbles trapped between the two glass surfaces being cemented. Temperatures of this order tended to decompose polystyrene and to induce objectionable strains into optical glass.

Lower softening points and more easily applied cements were obtained by polymerizing styrene in the presence of a viscous liquid polymer of alpha-methyl styrene. In effect, the finished material was polystyrene plus a styrenic plasticizer. With this formulation lenses could be cemented at lower temperatures. Inclusion of the plasticizer, however, so broadened the softening range of polystyrene that a cement soft enough for easy application failed to hold the optical elements in alignment at the upper limit of the specified temperature range (70° C.).

Although normally a linear thermoplastic substance, polystyrene can be converted to an infusible solid by the addition of a small amount (e. g. 1–5%) of divinyl benzene. Theory and practice demonstrated that styrene already in the polymeric form was incapable of appreciable reaction with divinyl benzene. Our attention was directed, therefore, to the preparation of a styrenic cement which could be applied to lenses in the form of a liquid and then polymerized to a tough, infusible solid possessing all the desirable properties of polystyrene.

Monomeric styrene itself was not a satisfactory cement, being too fluid for easy application. When catalyzed by a peroxide and cured between glass surfaces, severe crazing occurred in the cement layer during the polymerization process. A temporary improvement was effected by precuring or partially polymerizing styrene to a viscous liquid before application. Nonetheless, a cement composed entirely of polystyrene proved so brittle that it soon developed long, sharp cracks.

Cracking was eliminated by the inclusion of a plasticizer. Eighty parts of styrene monomer and twenty parts of alpha-methyl styrene liquid plasticizer were precured to a useable viscosity, applied to lenses and cured to the solid state. This composition was sufficiently tough to hold the elements in alignment at 70° C. Yet, exposure to varying conditions of temperature and humidity and especially to sub-zero temperatures quickly caused the formation of many small voids. These defects were attributed to the thermoplasticity of the cement which was free to eliminate internal strains by a slow process of shrinkage and viscous flow.

Divinyl benzene, therefore, was incorporated in the next formulation as a cross-linking agent. Sixty parts of styrene monomer, forty parts of alpha-methyl styrene liquid plasticizer and one part of divinyl benzene were precured to a useful viscosity, applied to lenses and cured to a rubbery infusible solid. No voids or cracks formed after repeated exposure to extremes of temperature and humidity. Separations of the cement from the glass were non-existent.

Although this blend possessed many characteristics desirable in an optical cement, the precure step, necessary to the attainment of a good cementing viscosity, was a definite drawback. It has since been possible to achieve the same result by the addition of a small amount of high molecular weight polystyrene. Although the overall composition of the precured cement and of the polymer-monomer cement are essentially similar, the latter has the advantages of greater stability, ease of preparation and more exact adjustment of viscosity.

The cement which has been selected as the most favorable contains:

| | Parts by weight |
|---|---|
| Polystyrene (commercial molding granules) | 12 |
| Styrene monomer (inhibited) | 48 |
| Alpha-methyl styrene liquid plasticizer | 40 |
| Divinyl benzene (inhibited) | 1 |

Although this composition is preferred, variations are possible within limits. The amount of polystyrene used depends on its molecular weight. Enough should be added to impart to the cement the desired viscosity. The total styrene fraction (polymer+monomer) may vary between 60–80 parts by weight, the other 40–20 parts by weight consisting of the styrenic plasticizer. From 1–5 parts by weight divinyl benzene may be added.

All the components of this cement are commercially available from Dow Chemical Company: Polystyrene as "Styron RI–K27," styrene monomer as "Styrene N–99," the plasticizer as "Dow Resin 276–V9," and divinyl benzene as "Monomer Q–302," containing 60 per cent divinyl benzene and 40 per cent ethyl vinyl benzene. Of these ingredients, only the plasticizer is a proprietary material. The other components are well-known organic chemicals.

The preferred formulation is prepared by mixing the prescribed components until solution is complete. It is stabilized for long shelf storage by virtue of the inhibitor, 4-tertiary butyl catechol, already present in both the styrene and divinyl benzene.

For use as an optical cement, the preferred formulation is mixed with one per cent by volume of a liquid catalyst, tertiary butyl perbenzoate for example, and applied to the glass elements in the conventional manner. The assemblies are baked, preferably for 16 hours at 110° C., to obtain optimum mechanical and optical properties. Cure times and temperatures may be varied between 16–40 hours and 110°–150° C.

When the preferred formulation is applied and baked in the recommended fashion, the properties of the cement film are excellent. Not one separation has appeared among a large number of test pieces subjected to wide temperature and humidity changes. There have been no cases of void or crack formation. The elements remain in alignment at the extremes of temperature required by military service.

The refractive index of the cured cement film is 1.57–1.59. Polarized light and star image patterns indicate a high order of optical isotropy (homogeneity). The distortion of the shape of the component elements is so little as to be negligible.

In short, the proposed composition of matter represents a substantial improvement over optical elements heretofore employed. Its advantages represent practically the antithesis of the faults noted in the prior art and are summarized in the following table:

(1) Liquid catalyst is permissible with quick and easy mixing;
(2) No precure is needed since the viscosity of the cement is adjustable in the formulating process;
(3) Shipping and storage for a number of months are possible without special precautions;
(4) The liquid form appears to be harmless to the skin;
(5) The catalyzed cement has a long liquid life time;
(6) Cured cement film is stable at high and low temperatures;
(7) There are no separations of cement from glass under widely varied conditions of temperature and humidity;
(8) No discoloration occurs with strong light;
(9) There is negligible distortion of optical elements;
(10) There is a high degree of optical isotropy.

From the foregoing, it will be evident to those acquainted with the art that we have discovered a new and valuable optical cement. Various combinations and permutations of the formulations herein mentioned as specific examples are, of course, possible without departing from the spirit and scope of our invention. Accordingly, we desire to be limited only by the scope of the following claims.

We claim:

1. The method of cementing optical elements which comprises: mixing with about 1 per cent by volume of tertiary butyl perbenzoate a liquid cement consisting of between 60 to 80 parts by weight of a styrene fraction made up of about 12 parts by weight of polystyrene and about 48 parts by weight of styrene, between 40 to 20 parts by weight of alpha-methyl styrene, and from 1 to 5 parts by weight of divinyl benzene; applying this mixture to the optical elements; and baking this assembly for between 16 to 40 hours at a temperature of between 110° to 150° C.

2. As a new article of manufacture, a cement for optical elements comprising, about 60 to 80 parts by weight of a stryene fraction made up of 12 parts by weight of polystyrene and about 48 parts by weight of styrene, 40 to 20 parts by weight of alpha-methyl styrene, and from 1 to 5 parts by weight of divinyl benzene.

3. The cement of claim 2, including as a catalyst about one per cent by volume of a liquid peroxide.

4. The cement of claim 2, including as a catalyst about one per cent by volume of tertiary butyl perbenzoate.

5. The step in the method of cementing optical elements which comprises application to said elements of a liquid cement formed by mixing together 40–20 parts by weight alpha-methyl-styrene, 1 to 5 parts by weight divinyl benzene, and a styrene fraction 60–80 parts by weight made up of approximately one part polystyrene and four parts of styrene monomer, then polymerizing the cement to a tough, infusible solid.

6. An optical cement consisting essentially of:

| | Parts by weight |
|---|---|
| Styrene fraction made up of 12 parts by weight of polystyrene and 48 parts by weight of styrene monomer stabilized with 4-tertiary butyl catechol | 60 |
| Alpha-methyl-styrene liquid plasticizer | 40 |
| Divinyl benzene stabilized with 4-tertiary butyl catchol | 1 |

References Cited in the file of this patent

UNITED STATES PATENTS

| 2,445,535 | Parsons et al. | July 20, 1948 |
| 2,479,486 | Gerhart | Aug. 16, 1949 |

FOREIGN PATENTS

| 506,290 | Great Britain | May 25, 1939 |